United States Patent Office 2,861,640
Patented Nov. 25, 1958

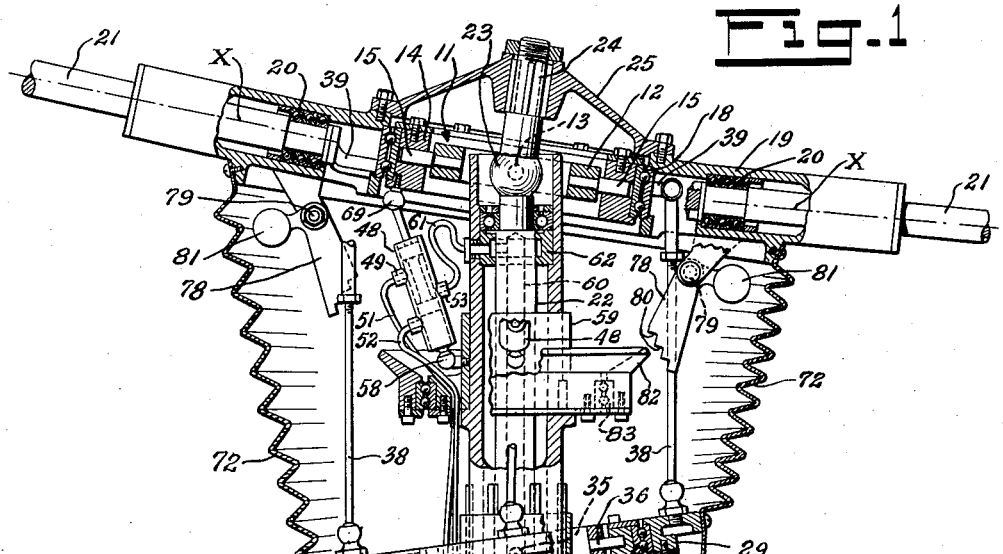

2,861,640

HELICOPTER ROTOR HEAD COMBINATION WITH MECHANISM TO FLY ROTOR LEVEL

Stephen du Pont, Southbury, Conn., assignor to Doman Helicopters, Inc., Danbury, Conn., a corporation of Delaware Application December 27, 1956, Serial No. 630,900

9 Claims. (Cl. 170—160.13)

The invention pertains to a helicopter rotor head having means for flying the rotor level or horizontal. When a rotor is turning at slow speed such as when slowing down or starting up, it is desirable that it be erected or leveled into alignment with the body of the helicopter so that the blades will not hit personnel, parts of the helicopter or obstructions on the ground. Tilt stops have been used to accomplish this result as will appear more fully hereinafter. Such tilt stops, however, subject the head to shock or hammer and it is the purpose of the invention herein to control the swash plate to fly the rotor to its erected or aligned position when turning at slow speed.

It is an object of the invention to construct a rotor head with means which flies the rotor to the aligned or leveled position.

Another object of the invention is to construct a rotor head with a servo motor connected with the swash plate to shift the same to a position under the control of a valve operated by the tilt position of the rotor so that the blades are pitched to a position which will fly the rotor to the erected or leveled position.

Other objects of the invention will be more apparent from the following description when taken in connection with the accompanying drawings illustrating preferred embodiments thereof in which:

Fig. 1 is a partial sectional view of a helicopter rotor head with the rotor leveling means;

Fig. 2 is a sectional view of an open control valve; and

Fig. 3 is a sectional view of a closed form of control valve.

Fig. 4 is a top view of a rotor with blades in reduced size.

The mechanism for controlling the blades of a helicopter rotor so that it can be flown to level or horizontal position by suitably changing the pitch of the blades requires that type of rotor head having a portion which tilts with respect to a stationary pylon with the tilt of the rotor but does not rotate. A rotor head of this type is illustrated. The rotor is mounted on a pylon or mast 10 which is stationary or fixed to the helicopter fuselage or frame in any suitable manner. At the upper end of the fixed pylon is a universal joint. The universal joint shown has a ring 12 mounted on the pylon by opposite pylon pivots 13 and a shell 14 mounted on the ring by opposite pivots 15 which are 90° from the pylon pivot 13. This shell may freely tilt to any position with respect to the pylon but it does not rotate being held non-rotatable by the pylon.

The shell rotatably mounts the rotor on suitable bearings 18. The rotor includes a blade casing 19 which is freely tiltable by virtue of the universal joint which mounts the shell on the pylon. The casing carries suitable bearings 20 for mounting a plurality of spaced blades 21 on the casing so that each blade may oscillate on a longitudinally extending feathering or pitch change axis X. The spars only of the blades are shown. The blade casing and blades are rotated from a drive shaft 22 within the pylon which shaft has a universal joint 23 preferably centered on the center of the universal joint which mounts the shell for tilting. A stub shaft 24 is connected with the drive shaft universal joint so that it may tilt freely with the rotor. This stub shaft has a driving connection of any suitable type with the blade casing, the construction illustrated using a plate or cap 25. The drive shaft is connected with a helicopter motor through gears 26 at its lower end.

Swash plate means is provided to change the pitch of the blades for each revolution of the rotor. The swash plate means has a rotatable part and a stationary part. In the construction illustrated, the outer ring 29 is the rotatable part and is mounted on a bearing 30 for rotation on the stationary part which is the inner part. As shown in application S. N. 196,470, the construction may be such that the outer ring is the stationary part and the inner part is the rotatable part. With either construction, the swash plate is mounted on the pylon by means of a universal joint so that the swash plate may tilt with respect to the pylon. Preferably this swash plate is mounted upon a carrier 31 which is movable vertically with respect to or on the pylon by a connection 32 so that collective pitch change of the blades of the rotor may also, be secured for each blade of the rotor as is known. The universal joint for the swash plate particularly shown includes a ring 34 mounted on the carrier on opposite pivots 35. The ring carries opposite pivots 36 spaced 90° from the first pivots on which the non-rotatable part or ring 37 of the swash plate is pivotally mounted. The rotating part or ring 29 of the swash plate means is connected to each blade of the rotor by a link 38 for each blade to a horn 39 secured to the end of each blade so that each blade is oscillated or has its pitch changed on its longitudinal axis S once for each revolution of the rotor. The change in pitch of each blade as it rotates with the blade casing is therefore controlled by the tilt and/or position of the swash plate. In normal flight the tilt of the swash plate is controlled by the pilot from the stick, through connections which are well known and not illustrated.

A servo motor is used to shift the swash plate when it is desired to fly the rotor level. It is shown as a fluid motor and preferably operated by hydraulic pressure such as oil. This servo motor includes cylinder means 42 having a double acting piston means 43 movable therein. The servo motor particularly shown is a single cylinder, single piston double acting type of servo motor. The piston means divides the cylinder means into two end chambers. One of the means, shown particularly as the cylinder means, is mounted on the pylon or as illustrated, the carries 31 slidably carried on the pylon by a pivot or joint 44. The other or the piston means is connected to the stationary part of the swash plate by a pivot or joint 45. Two such servo motors are used connected to the swash plate means spaced 90° apart so that the latter may be tilted sidewise, or fore and aft or in both directions. The feeding of fluid pressure to one of the chambers and exhausting fluid from the other chamber of each servo motor tilts the swash plate.

Each servo motor is controlled by a control valve of any construction connected with the shell so as to be controlled thereby which opens one of two outlets for one tilt position of the rotor and the other outlet upon an opposite tilt position of the rotor. The control valve shown has a casing means 48 with a pair of spaced outlets 49 and 50 therein. The upper outlet 49 is connected by a tube 51 with the lower chamber of the cylinder means 42 of the servo motor and the other or lower outlet 50 is connected by a tube 52 with the chamber at the other or upper end of the cylinder means. The valve casing or member also has an inlet 53 which is connected with a suitable source of fluid pressure. The valve includes a slider or valve head member 54 which is shiftable with respect to the valve casing member. The slider member has a pair of spaced flanges 55 and 56, the space between the flanges providing a connection between the inlet and one of the outlets. The valve head member may have a central bore 57 to drain fluid from the upper end to the lower end.

One of the control valve members such as the valve head mechanism connected to the non-rotatable shell of the rotor by a pivot or joint 69. The other or casing member of the valve is connected by a pivot or joint 58 with the pylon or particularly a collar 59 fixed to the pylon. The inlet connection to the control valve may be made in any desirable way, that particularly illustrated being through a tube 61 connected between the valve inlet 53 and a central bore 60 in the drive shaft. A gland 62 secured to the pylon and having a circumferential groove makes a fluid connection with the rotating shaft. A connection 63 is made at the lower end of the drive shaft with a fluid pressure pipe line 64 which includes an operating valve 65. This valve may be manually opened and closed to supply fluid to the inlet of the servo motor control valves 48 or it may be automatically opened and closed in any manner responsive to the speed of the rotor or drive shaft such as by a centrifugal mechanism 66 carried by the lower end of the drive shaft. At high speed the weights 70 of the mechanism move outwardly and pull the valve collar 67 links 71 and connecting link 68 upwardly to close the valve 65. At slow speeds of the shaft the valve collar 67 is moved downwardly to open the valve. The fluid pressure source may be a pump.

A second servo motor 42 as described is provided for the swash plate 90° spaced from the other so the swash plate is tilted both sidewise and fore and aft. A control valve 48 as described is provided for this second servo motor and is connected with the rotor casing 90° from the other control valve.

If when slowing down or starting up of the rotor, it has or tends to have a tilted position as shown in Fig. 1, upon opening of the operating valve 65 fluid under pressure is applied to the inlet 53 of the control valve. With the valve head member 54 in raised position there is a connection from the inlet to the outlet 49 which feeds fluid to the lower chamber of the servo motor 42 and the piston 43 is moved upwardly and tilts the left side of the swash plate upwardly. If the tilt of the rotor is oppositely from that illustrated, then a connection is established in the control valve between the inlet and the outlet 52 which feeds fluid pressure to the upper chamber of the servo motor and moves the piston downwardly. This tilts the swash plate in a downward direction and thereby controls the pitch angle of the blades so that the blades fly the rotor to horizontal or level position. Upon the rotor being level, fluid pressure is fed to both valve outlets 49 and 50 and both chambers of the servo motor and the swash plate is held in level position.

In the control valve construction particularly illustrated in Fig. 2, the discharge of fluid from the non-pressure side of the piston means 43 is through the tube 52 and out of the control valve casing into a rotor head chamber formed by a longitudinally flexible tubular housing 72 which surrounds at least part of the rotor head mechanism. The flexible housing is that set forth in the Doman application S. N. 196,470. In the construction shown the housing surrounds the entire rotor head mechanism. This flexible housing connects the blade casing 19 and the rotatable part 29 of the swash plate so that the latter rotates at the same speed as the rotor. The corrugations make the housing axially flexible so that the rotor has freedom to tilt to any angle over the rotor tilt range. The housing also serves as an oil enclosure for both the lubricating oil for the mechanism within the housing as well as the hydraulic fluid for the servo motor system. The oil goes to a drip pan 73 and then to a reservoir from which the fluid may be pumped under pressure to the inlet of the control valve. It is clear that the valve casing of the control valve may be closed as shown in Fig. 3 and the discharged hydraulic fluid returns to a reservoir through a discharge pipe 74. This construction is used when there is no housing for the rotor head. When the rotor is turning level or horizontal, pressure is applied to both chambers of the servo motor to retain the swash plate in level position.

The leveling mechanism may be used in conjunction with tilt stops. The tilt stops may be of any suitable form that particularly illustrated being described in my application S. N. 526,198. The tilt stop includes a plurality of tilt stop lugs 78 placed circumferentially around the blade casing of the rotor. Each lug is mounted to the blade casing upon a pivot 79 so that it rotates therewith and so that the lug may pivot outwardly or inwardly thereon. Each lug has a plurality of lands 80 of different radial distances from the lug pivot. The lug carries a centrifugal weight 81 which holds the lug away from operative position at normal speeds of the rotor. However, when the rotor slows down such as when starting or stopping, the gravity weight moves downwardly to swing the lug to bring a land into contact with a rotating collar 82 carried by the pylon. Preferably this collar is mounted on bearings 83 for rotation. It depends upon the angle of inclination of the rotor which determines which land engages the collar. If the rotor is sharply tilted the land of minimum radius from the lug pivot 79 engages the collar and aids in tilting the rotor to level position.

As shown and described in my application aforesaid, the lands may be carried on the lug stop collar and a single land is provided on the stop lug. When the rotor flies into alignment by the mechanism described herein, the tilt stop means assures or aids in preventing a gust of wind from shifting the rotor to a tilted position and carries the erecting action throughout the regime of slow blade rotation where aerodynamic lift of the blades can no longer control them.

I claim:

1. A helicopter rotor head combination comprising a fixed pylon, a rotor shell, a universal joint mounting the shell on the pylon for universal tilting; a rotor including a blade casing, means rotatably mounting the blade casing on the shell, blades having a longitudinally extending axis, and means mounting each blade on the casing for pitch change on its axis; a swash plate including a rotatable part, a non-rotatable part, a bearing between the parts, a universal joint mounting one of the parts on the pylon for universal tilt with respect to the pylon, and a link for each blade connecting the rotatable part of the swash plate with its respective blade; a pair of servo motors located 90° apart with respect to the pylon, each motor including cylinder means, piston means in the cylinder means, means providing two chambers in the cylinder means, means pivotally connecting one of the servo motor means to the non-rotatable part of the swash plate, and means pivotally connecting the other servo motor means to a relatively stationary member carried on the pylon; a pair of control valve means one for each servo motor connected between the shell and the pylon and spaced 90° apart with respect to the pylon, each control valve means including a first member having a first outlet and a second outlet spaced from each other and an inlet, a fluid connection from one outlet to one chamber of the cylinder means, a fluid connection from the other outlet to the other chamber of the cylinder means, a discharge outlet for the valve means, and each control valve means including a second member connecting the first outlet with the inlet and the second outlet with the discharge outlet when the shell is tilted above horizontal and connecting second outlet with the inlet and the first outlet with the discharge outlet when the shell is tilted below horizontal, and means pivotally connecting one member of the control valve to the shell and the other member to the pylon.

2. A helicopter rotor head combination as in claim 1 in which the first member is a cylinder having an open end forming the discharge outlet, and a housing around at least a portion of the swash plate.

3. A helicopter rotor head combination as in claim 2 in which the housing is an axially flexible tube connecting the rotatable part of the swash plate to the blade casing.

4. A helicopter rotor head combination as in claim 1 in which the first member is a valve cylinder having closed ends and the second member is a valve piston slidable in the valve cylinder, the discharge outlet being connected with the lower end of the valve cylinder, and a connection between the upper end of the valve cylinder and the discharge outlet.

5. A helicopter rotor head combination as in claim 4 in which the connection between the upper end of the valve cylinder and the discharge outlet is a hole through the valve piston.

6. A helicopter rotor head combination as in claim 1 including an operating valve connected with the inlet of the control valves, and means responsive to the rotation of the rotor head to open and close the operating valve.

7. A helicopter rotor head combination as in claim 6 in which the means responsive to the rotation of the rotor head is a centrifugal mechanism mounted on the drive shaft and connected with the operating valve.

8. A helicopter rotor head combination as in claim 1 including a pivoted tilt stop lug member pivotally carried by the blade casing and a tilt stop collar member carried by the pylon.

9. A helicopter rotor head combination as in claim 8 including a plurality of lands of different radii carried by one of said tilt stop members.

References Cited in the file of this patent

UNITED STATES PATENTS

| | | |
|---|---|---|
| 2,439,089 | Hodson | Apr. 6, 1948 |
| 2,529,479 | Bates | Nov. 14, 1950 |
| 2,550,538 | Doman | Apr. 24, 1951 |
| 2,652,898 | Renoux | Sept. 22, 1953 |
| 2,677,429 | Loufer | May 4, 1954 |
| 2,677,430 | Prince | May 4, 1954 |